United States Patent [19]
Pearl

[11] Patent Number: 4,545,275
[45] Date of Patent: Oct. 8, 1985

[54] BLADE FOR SEVERING FIBROUS MATERIAL

[75] Inventor: David R. Pearl, West Hartford, Conn.

[73] Assignee: Gerber Garment Technology, Inc., South Windsor, Conn.

[21] Appl. No.: 464,621

[22] Filed: Feb. 7, 1983

[51] Int. Cl.[4] ............................................. D06H 7/00
[52] U.S. Cl. ....................................... 83/747; 83/578; 83/697; 83/925 CC; 30/273
[58] Field of Search ................. 30/273, 275, 351, 353, 30/355; 83/697, 660, 854, 835, 925 CC, 578, 747

[56] References Cited

U.S. PATENT DOCUMENTS

| | | | |
|---|---|---|---|
| D. 94,945 | 3/1935 | Burdge | 30/353 |
| 2,636,267 | 4/1953 | Whitcomb | 30/355 |
| 2,671,267 | 3/1954 | Michalek | 30/355 |
| 3,001,287 | 9/1961 | Rocovich | 30/275 X |
| 3,573,857 | 4/1971 | Sederberg | 30/355 X |
| 4,133,236 | 1/1979 | Pearl | 83/925 CC |

FOREIGN PATENT DOCUMENTS 80092  8/1894  Fed. Rep. of Germany ........ 30/353

*Primary Examiner*—James M. Meister
*Attorney, Agent, or Firm*—McCormick, Paulding & Huber

[57] ABSTRACT

An elongated blade has a notch in its leading edge, with parallel chisel edges adapted to chop through the oriented fibers (boron or graphite) of uncured sheet material as the blade is reciprocated vertically at a high frequency relative to its forward velocity (five cycles per blade width). The notch is about half as deep as the blade width and has a vertical extent (between the chisel edges) of about 60 percent of the blade's vertical stroke. The blade has a lower edge which forms a 135 degree angle with it's leading edge, and which lower edge is spaced below the lower notch chisel edge by approximately the width of the blade.

2 Claims, 6 Drawing Figures

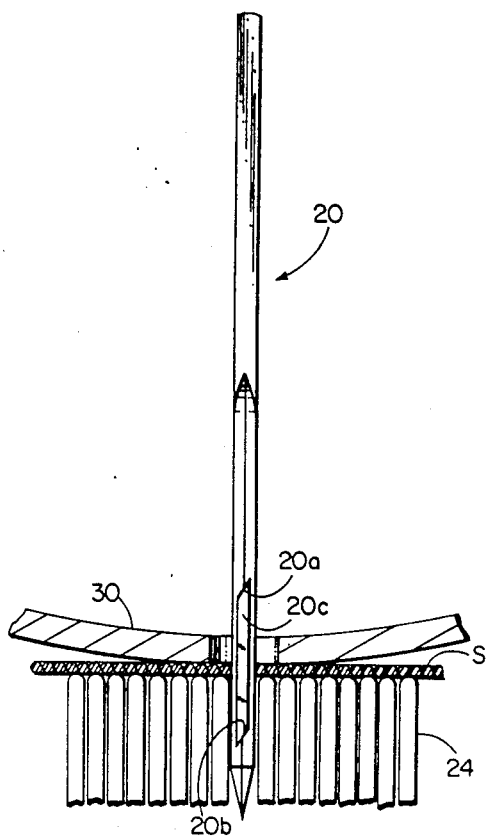
FIG. 4　　　　　FIG. 5
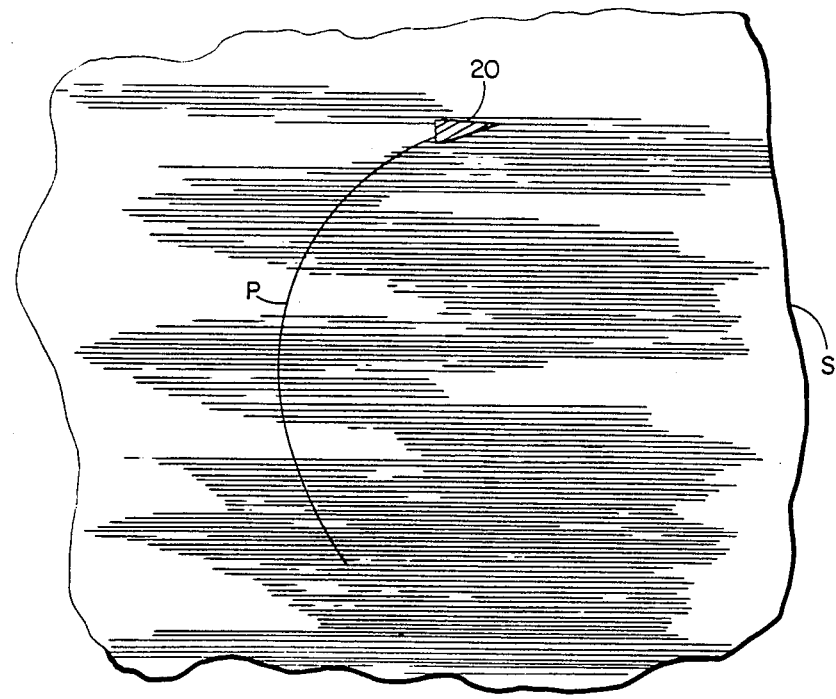
FIG. 6

BLADE FOR SEVERING FIBROUS MATERIAL

BACKGROUND OF THE INVENTION

This invention relates generally to severing fibrous sheet material, particularly aerospace material of the type having side-by-side boron or graphite fibers in an epoxy matrix. More specifically, this disclosure deals with a novel method of cutting such oriented fibrous material with a notched blade so moved relative to the material that the upper and lower sides of the notch chop through the material along a line of cut which may be at any angle to the orientation of the fibers.

Notched blades are known from prior art patents such as U.S. Pat. No. 4,133,236 to the same inventor, and U.S. Pat. No. 255,358 to Warth. Sheet material cutting apparatus are also well known, indeed cutting heads capable of computerized control are commercially available. Such an apparatus is shown and described in U.S. Pat. No. 3,955,458 and U.S. Pat. No. 4,033,214 both issued to the inventor herein. Such units include a vertically reciprocating cutting blade suspended from a cutting head in a carriage capable of moving the head in a horizontal plane to cut material spread on a support surface. The head includes means for rotating the blade on its longitudinal axis in order to remain tangential to a desired line of cut and to be rotated in anticipation of a very sharp corner in the line of cut. In situ sharpening of such blades by devices incorporated in the head are also known, including blade sharpening devices capable of sharpening laterally skewed notches in the blade leading edge (See U.S. Pat. No. 4,133,236 for such blade sharpening devices).

SUMMARY OF THE INVENTION

The chief aim of the present invention is to provide a reciprocating blade in the cutter head of a computer controlled cutting machine such that a notched blade can efficiently cut through a fibrous sheet material of oriented boron or graphite filaments without regard to whether the line of cut is perpendicular or parallel to the fiber orientation, or at any angle inbetween.

In carrying out the method of the present invention the oriented fibrous sheet material is spread onto, and supported by the bristle bed of an automatically controlled cutting machine so that a reciprocating blade can be moved along a line of cut to sever the sheet. The blade moves through at least five cycles (five strokes up and five down) as it advances one blade width. The blade defines a deep notch in its leading edge, which notch has a depth of approximately one half the blade width and a height of about 60 percent of the blade's vertical stroke. The sheet material is severed by the vertically spaced top and bottom chisel edges of this notch in a chopping action well suited to sever the relatively stiff and very strong fibers in the sheet material. A presser foot is provided around the blade to support the sheet material as the lower chisel edge of the notch moves upwardly to sever the sheet. The bristle bed supports the sheet during downward blade movement.

BRIEF DESCRIPTION OF THE DRAWINGS

FIG. 4 is a side elevational view of the blade shown in FIGS. 2 and 3.

FIG. 5 is a front view of the blade, being taken through the sheet and the support surface at the midpoint of its vertical stroke.

FIG. 6 is a plan view of the sheet material being cut along a line extending across the oriented filaments and also extending generally parallel to the filaments.

DETAILED DESCRIPTION

Figure 1:
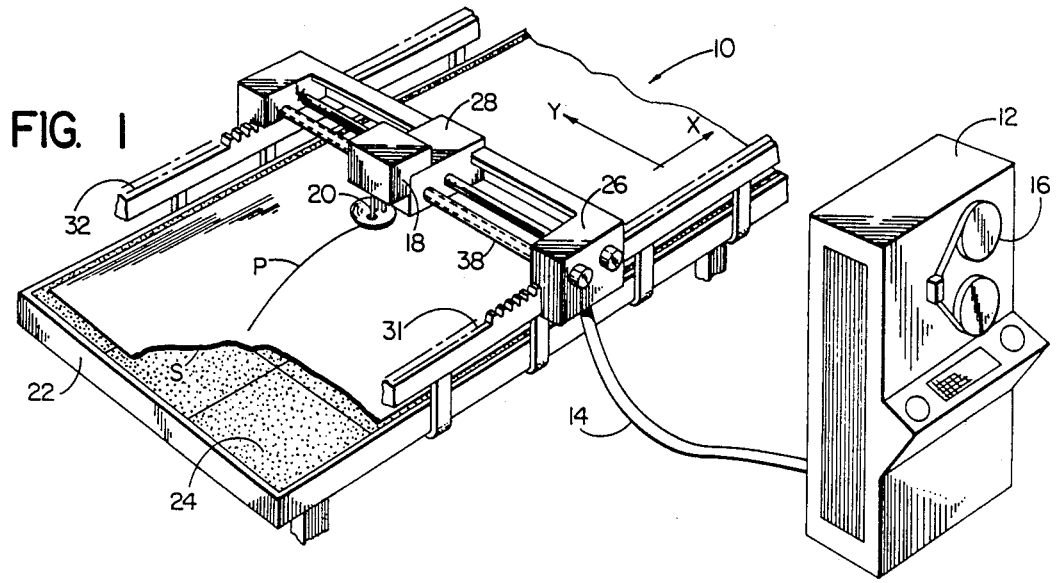
FIG. 1 is a perspective view of a computer controlled cutting machine capable of cutting sheet material in accordance with the present invention, portion of the sheet and the table being shown broken, away.

FIG. 1 illustrates an automatically controlled sheet cutting apparatus, indicated generally at 10, and generally similar to that described in U.S. Pat. No. 3,495,392 entitled "Apparatus For Working On Sheet Material". The apparatus 10 also includes a blade sharpening device such as that shown in U.S. Pat. No. 4,133,236 to the same inventor, David R. Pearl. The apparatus 10 is numerically controlled by a computer controller 12 connected to it by a cable 14. A tape storage 16 converts the data into machine commands for guiding the reciprocating blade 20 along a programmed path P, which path may be the periphery of a pattern piece or panel. In the present disclosure, the sheet material preferably comprises a single sheet or ply S rather than a layup, and more particularly, the sheet S comprises a composite of oriented space age fibers, such as boron or graphite, in an epoxy matrix which is generally uncured in this cutting stage.

Figure 3:
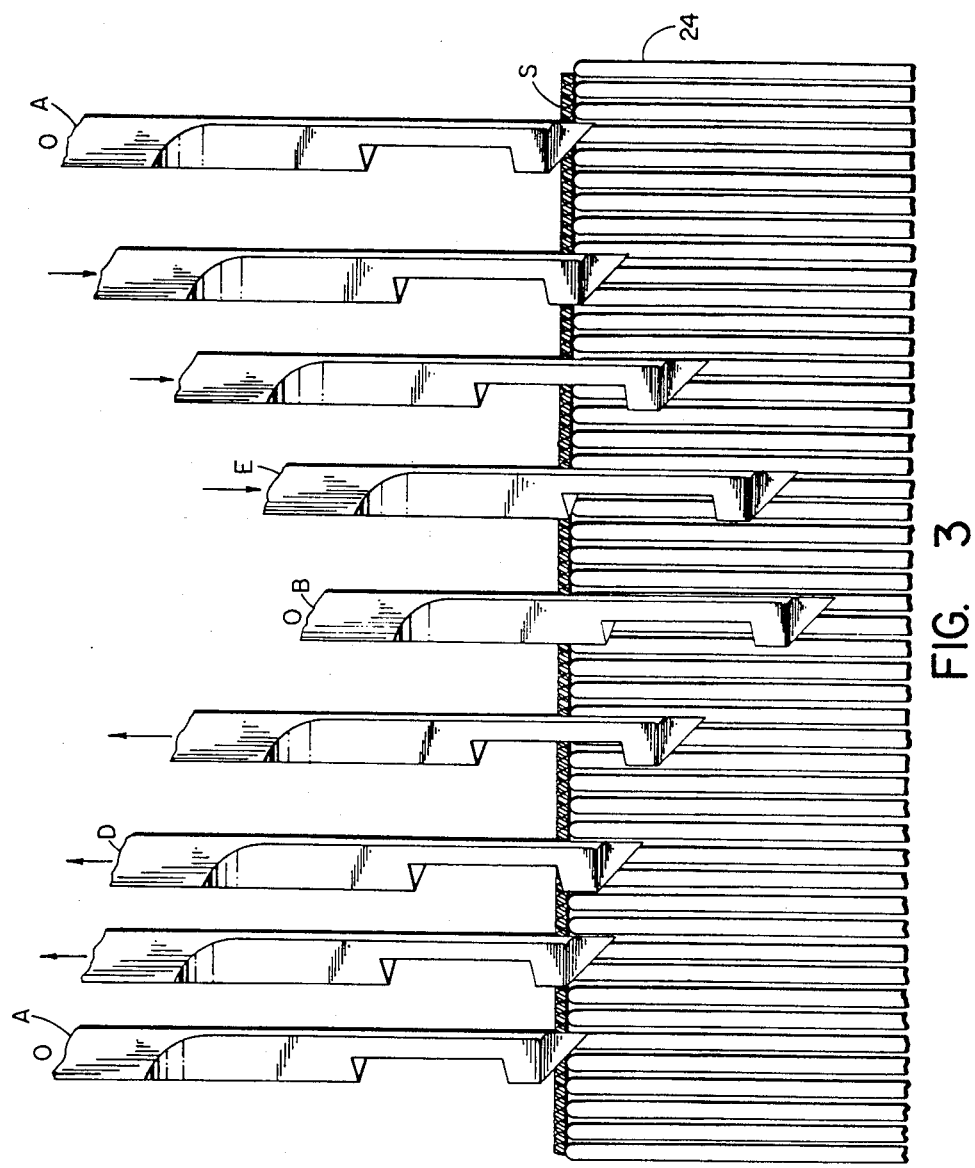
FIG. 3 is a schematic view, greatly expanded in the horizontal direction, illustrating the path of motion for the blade of FIG. 2 during one cycle of its vertical reciprocating and horizontal translational movement.

Still with reference to FIG. 1, the apparatus 10 includes a table 22 having a penetrable bed 24, of upwardly projecting bristles as shown in FIG. 3, to define a support surface for the sheet material S. These bristles are of plastic material, being relatively stiff and capable of reacting vertical forces imposed thereon by the cutting blade 20, but also capable of moving or bending laterally as necessary to allow the blade 20 to follow the path P. A vacuum hold down system, such as shown and described in the above mentioned U.S. Pat. No. 3,495,392 is also provided to hold the sheet material in fixed relation to the bed. A polyethelene sheet (not shown) may also be used to preserve the vacuum below the sheet.

The blade 20 is mounted in a cutting head 18 which is movable in the X and Y directions as a result of carriages 26 and 28, the latter being movable along the former to cause cutting head 18 to move in a horizontal plane. Carriage 28 is movable in the X direction on racks 30 and 31 at the sides of the table 22, and carriage 26 is movable in the Y direction by lead screw 38. Drive motors 34 and 36 are energized from the controller 12 to cause movement of the X and Y carriages, 26 and 28 respectively. A drive motor (not shown) in the head 18 provides reciprocating movement of the blade 20 under the control of controller 12, and at a frequency (f) such that the blade 20 moves through approximately five cycles (10 vertical up and down strokes) as it moves a linear distance corresponding to it's own width W).

The path of the reciprocating blade 20 is illustrated schematically in FIG. 3 wherein the horizontal displacement of the blade has been expanded approximately 100 times to depict one vertical reciprocation cycle. The apparatus for moving the blade in it's X and Y direction (horizontally) must do so at a speed of 200-400 inches per minute, and the means for reciprocating the blade between the limit positions shown at A and B in FIG. 3 preferably does so at approximatley 4000 cycles per minute. This speed relationship will provide a ratio of forward progress to frequency in the range of 200/4000 and 400/4000 inches per cycle (that is 0.05-0.10 inches per cycle). In order to achieve the desired condition referred to previously (of five cycles per blade width) it follows that the blade 20 should have a width of at least approximately 3/32 of an inch. This geometry will provide substantially all cutting action of the blade 20 to be accomplished by the most forward portions of vertically spaced chisel edges 20a and 20b of a notch 20c formed in the blade leading edge 20d.

As best shown in FIG. 3, the blade 20 has this relatively deep notch 20c, with a depth of approximately one half the blade width and a vertical height of approximately 60 percent the vertical stroke made by the blade during it's reciprocating movement. This relationship assures that the vertical speed of the blade 20 will be at or near it's maximum as the chisel edges 20a and 20b chop through the sheet S at blade positions E and D respectively. The motion of blade 20 is basically sinusoidal in its oscillatory advancing mode, and therefor maximum cutting speed occurs between the limit positions A and B in FIG. 3.

Figure 2:
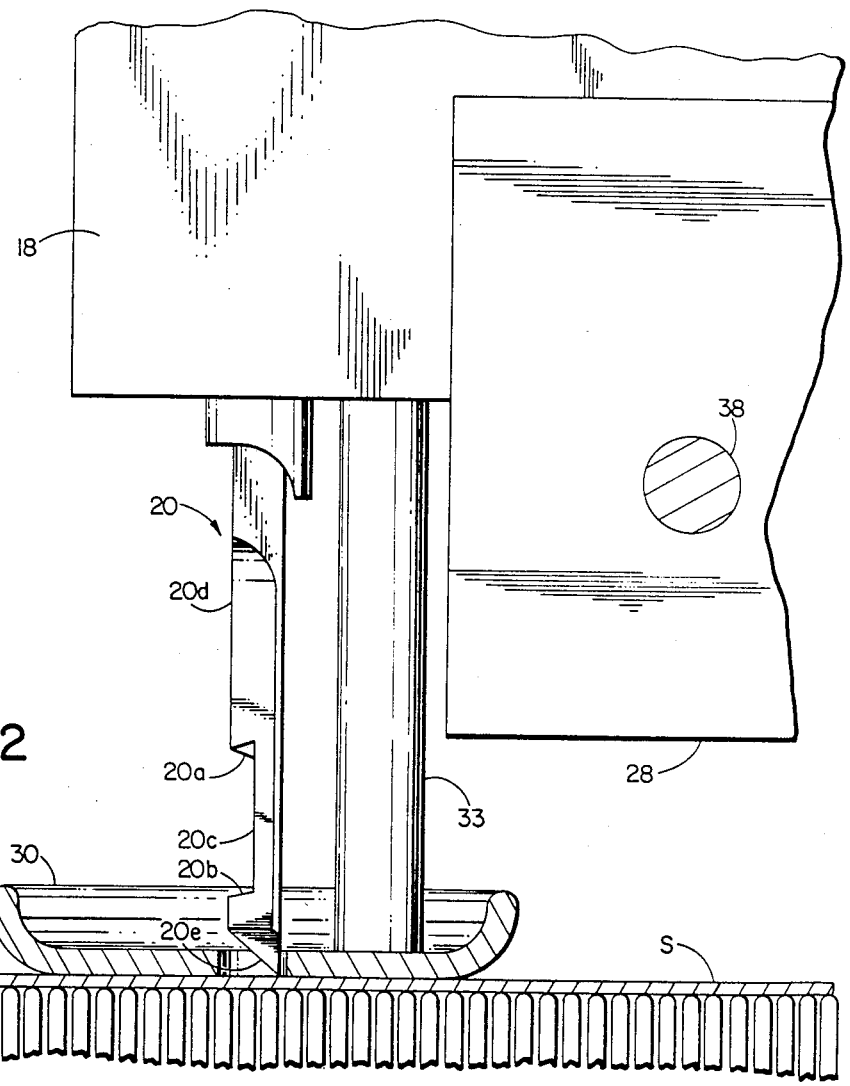
FIG. 2 is an enlarged fragmentary side elevational view of the cutting head shown in FIG. 1.

As the upper chisel edge 20a chops down through the sheet S (position E) it will be apparent that the bristle bed 24 supports the sheet during this downward stroke of the blade. As best shown in FIGS. 2 and 5 a pressure foot 30 is provided on a depending post 33 to hold the sheet S downwardly during the upward stroke of the blade (see position D in FIG. 3).

Still with reference to the configuration of the blade 20, FIG. 4 shows the V-shaped leading edge 20d defined by opposed sharpened, or ground surfaces, and the lower end of which cooperates with a lower edge 20e which is also V-shaped and defined by opposed sharpened surfaces. These edges 20d and 20e define an included angle of approximately 135 degrees (and which angle is preferably in the range between 120-150 degrees). As so configured it will be seen from FIG. 3 that this lower edge 20e does achieve some cutting of the sheet S during downward blade motion from the right hand limit position A of FIG. 3 to the adjacent blade position.

Turning next to a more detailed consideration of the specific sheet material to be cut, FIG. 6 shows the orientation of it's parallel fibers of graphite or boron and also shows that the path P of the blade 20 can be either across these fibers or close to tangential with respect thereto. It is in this latter position that the blade 20 displays its most impressive advantages. As a result of the incremental chopping action of the chisel edges 20a and 20b the parallel fibers are cut only a few at a time and there is very little tendency for the blade 20 to tend to displace these fibers laterally in lieu of cutting them.

Thus, it is an important feature of the present invention that the notch 20c have generally horizontally extending chisel edges 20a and 20b for so chopping the fibrous sheet material. Furthermore, the notch 20c has a non-sharpened inner boundary 20c and these upper and lower edges 20a and 20b are parallel to one another and generally horizontal. As best shown in FIG. 5 these chisel edges 20a and 20b can be conveniently sharpened by moving a skewed sharpening device through the blade notch at an angle of approximately 45 degrees to the longitudinal axis of the blade 20. Although 45 degrees is the presently preferred skew angle for this single notch 20c in the blade 20, any angle in the range between 30 degrees to 60 degrees will provide some of the advantages of the invention.

Finally, the blade 20 can be seen from FIG. 4 to have its single notch 20c located close to the lower edge 20e in order to minimize the vertical stroke required to achieve the advantages alluded to above. Thus, the lower edge 20b of notch 20c is located adjacent to this lower edge 20e and more particularly the vertical distance the middle of notch 20c and edge 20e between is in the same dimensional range as the height of the notch itself (that is, in the range of 60 percent of the blade stroke). The notch depth is preferably in the range of 40-60 percent of the blade width as mentioned above, and the said vertical distance between the notch lower edge 20b and the blade lower edge 20e is preferably comparable to the blade width so as to minimize the vertical stroke required to cut through the sheet material during both the downward and the upward movement of the blade.

I claim:

1. Apparatus for severing fibrous sheet material along a line of cut which may be oriented at any desired angle to oriented fibers contained in the sheet material, said apparatus comprising a bed for supporting the sheet material, carriage means movable relative to the bed, an elongated blade supported in said carriage and oriented perpendicularly to the sheet material to be cut, control means for said carriage such that the blade can be moved along an intended line of cut at a linear speed S, means for reciprocating the blade on its own axis in a cyclical fashion between up and down vertically spaced limit positions and at a frequency (f) such that the blade moves through approximately five cycles as it moves a linear distance corresponding to its own width, said blade having a leading edge and a lower edge both of which are sharpened so as to cause cutting suring blade reciprocation, said blade defining a generally rectangular notch with upper and lower edges defing vertically spaced chisel segments, said chisel segments being defined by relieved portions on opposite sides of said blade and said notch being the only notch provided in the leading edge of said blade, said reactangular notch having an inner edge generally parallel to the blade leading edge which inner notch edge is not sharpened, and which inner edge is spaced from the sharpened leading edge by approximately 40-60% of the blade width, said rectangular blade notch having a vertical dimension approximately 50-70% of the blade's vertical reciprocating stroke, and said means for reciprocating said blade between said vertically spaced limit positions presenting said chisel segments to the upper and lower surfaces of said oriented fibrous material at near the maximum linear speed of reciprocation of the blade through the material.

2. The apparatus of claim 1 further characterized by presser foot means acting on the upper surface of the sheet material being so cut to assist in holding the material downwardly especially during upward motion of the reciprocating blade.

* * * * *